(12) United States Patent
Krivenok et al.

(10) Patent No.: US 11,989,460 B2
(45) Date of Patent: May 21, 2024

(54) CAPACITY EXPANSION IN A VIRTUAL STORAGE APPLIANCE

(71) Applicant: Dell Products L.P., Round Rock, TX (US)

(72) Inventors: Dmitry Vladimirovich Krivenok, Saint Petersburg (RU); Amitai Alkalay, Kadima (IL)

(73) Assignee: Dell Products L.P., Round Rock, TX (US)

( * ) Notice: Subject to any disclaimer, the term of this patent is extended or adjusted under 35 U.S.C. 154(b) by 33 days.

(21) Appl. No.: 17/965,262

(22) Filed: Oct. 13, 2022

(65) Prior Publication Data
US 2024/0126481 A1    Apr. 18, 2024

(51) Int. Cl.
*G06F 3/06*    (2006.01)

(52) U.S. Cl.
CPC .......... *G06F 3/0664* (2013.01); *G06F 3/0607* (2013.01); *G06F 3/0673* (2013.01)

(58) Field of Classification Search
CPC .... G06F 3/0647; G06F 3/067; G06F 11/1008; G06F 11/1076; G06F 12/0804; G06F 12/0806; G06F 2212/222; G06F 2212/60; G06F 2212/601; G06F 3/061; G06F 3/0613; G06F 3/064; G06F 3/065; G06F 16/119; G06F 16/182; G06F 16/188; G06F 3/0607; G06F 3/0665
See application file for complete search history.

(56) References Cited

U.S. PATENT DOCUMENTS

| | | |
|---|---|---|
| 2021/0026670 A1 | 1/2021 | Krivenok et al. |
| 2021/0034260 A1 | 2/2021 | Lyon et al. |
| 2021/0034288 A1 | 2/2021 | Krivenok et al. |
| 2021/0034429 A1 | 2/2021 | Krivenok et al. |
| 2023/0080046 A1* | 3/2023 | Paul .............. G06F 3/067 707/822 |

* cited by examiner

*Primary Examiner* — Yong J Choe
(74) *Attorney, Agent, or Firm* — BainwoodHuang

(57) ABSTRACT

A virtual storage appliance receives a request to increase its total storage capacity, and processes the request by performing a resize operation on all backend virtual volumes that are attached to the virtual storage appliance while efficiently considering constraints of the cloud computing platform and its own system constraints. The resize operation increases a size of each one of the backend virtual volumes, e.g., by the same amount. In response to detecting that the resize operation has been completed on all the backend virtual volumes, the virtual storage appliance indicates that a new, increased total storage capacity of the virtual storage appliance is available for use. The resize operation is performed without moving any previously stored contents of the backend virtual volumes, and without changing the total number of backend virtual volumes that are attached to the virtual storage appliance.

18 Claims, 11 Drawing Sheets

CAPACITY EXPANSION IN A VIRTUAL STORAGE APPLIANCE

TECHNICAL FIELD

The present disclosure relates generally to data storage systems, and more specifically to technology for expanding the data storage capacity of a virtual storage appliance.

BACKGROUND

A Virtual Storage Appliance (VSA) is a software appliance that executes on a virtual machine (e.g., an "instance") provided by a cloud computing platform. During operation, a VSA uses non-volatile data storage of one or more backend virtual volumes that are provided by the cloud computing platform and attached to the VSA, to support processing of host I/O requests received by the VSA from virtual or physical host machines ("hosts"). The host I/O requests received and processed by the VSA specify user data that is written and/or read by the hosts. The VSA includes software logic that processes host I/O requests by performing various data processing tasks to efficiently organize and persistently store user data in user accessible storage objects that are built by the VSA using the non-volatile data storage of the backend virtual volumes.

SUMMARY

In the disclosed technology, a virtual storage appliance receives a request to increase its total storage capacity, and processes the request by performing a resize operation on all backend virtual volumes that are attached to the virtual storage appliance. The resize operation increases a size of each one of the backend virtual volumes. In response to detecting that the resize operation has been completed on all the backend virtual volumes, the virtual storage appliance indicates that a new, increased total storage capacity of the virtual storage appliance is available for use.

In some embodiments, the resize operation performed on the backend virtual volumes is completed while retaining all previously stored contents in place on the backend virtual volumes, without moving any data that was previously stored on the backend virtual volumes.

In some embodiments, performing the resize operation on all the backend virtual volumes increases the size of each one of the backend virtual volumes by the same amount.

In some embodiments, during initialization of the virtual storage appliance, a total number of backend virtual volumes to be attached to the virtual storage appliance is determined, based on multiple constraints. The same total number of backend virtual volumes that are initially attached to the virtual storage appliance, as determined during initialization of the virtual storage appliance, is maintained throughout the processing of one or more requests to increase the total storage capacity of the virtual storage appliance.

In some embodiments, further during initialization of the virtual storage appliance, an initial backend virtual volume size is determined, also based on the multiple constraints. The initial backend virtual volume size is the same for each of the backend virtual volumes.

In some embodiments, the total number of backend virtual volumes attached to the virtual storage appliance determined during initialization of the virtual storage appliance comprises a maximum number of attached backend virtual volumes that is allowed by the multiple constraints.

In some embodiments, the virtual storage appliance executes on an instance (e.g., a virtual machine) of a cloud instance type that is defined by the cloud computing platform, and the multiple constraints include at least one constraint defined by the cloud instance type.

In some embodiments, the backend virtual volumes are cloud storage volumes (e.g., virtual disks) of a cloud storage volume type that is defined by the cloud computing platform, and the multiple constraints further include at least one constraint defined by the cloud storage volume type.

In some embodiments, the multiple constraints further include at least one system constraint defined by program code of the virtual appliance.

In some embodiments, the virtual storage appliance processes host I/O (Input/Output) requests received by the virtual storage appliance from one or more hosts. The processing of the host I/O requests includes using the backend virtual volumes to create user accessible storage objects that are accessed by the host I/O requests.

In some embodiments, indicating that the new, increased total storage capacity of the virtual storage appliance is available for use includes indicating to an administrator user that the new, increased total storage capacity of the virtual storage appliance is available for use.

In some embodiments, the request to increase the total storage capacity of the virtual storage appliance includes a requested new total storage capacity, and the request to increase the total storage capacity of the virtual storage appliance is validated at least in part by determining whether a result of dividing the requested new total storage capacity by a total number of the backend virtual volumes is evenly divisible by a minimum, per-backend virtual volume increment of increase.

The disclosed technology is integral to providing a practical technical solution to the shortcomings of previous technologies. For example, the disclosed technology is a practical solution to the problem of increasing the total capacity of a virtual storage appliance in a way that does not increase the total number of backend virtual volumes attached to the virtual appliance. In another example, the disclosed technology eliminates the need for rebalancing data previously stored on the backend virtual volumes. The disclosed technology efficiently operates within constraints and limitations of instance and storage volume types provided by the cloud computing platform, and within system constraints of the virtual storage appliance. Embodiments of the disclosed technology advantageously reduce costs related to resources of the cloud computing platform that must be provisioned to and used by the virtual storage appliance. The disclosed technology may accordingly reduce the Total Cost of Ownership (TCO) of the virtual storage appliance.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

DETAILED DESCRIPTION

Figure 1:
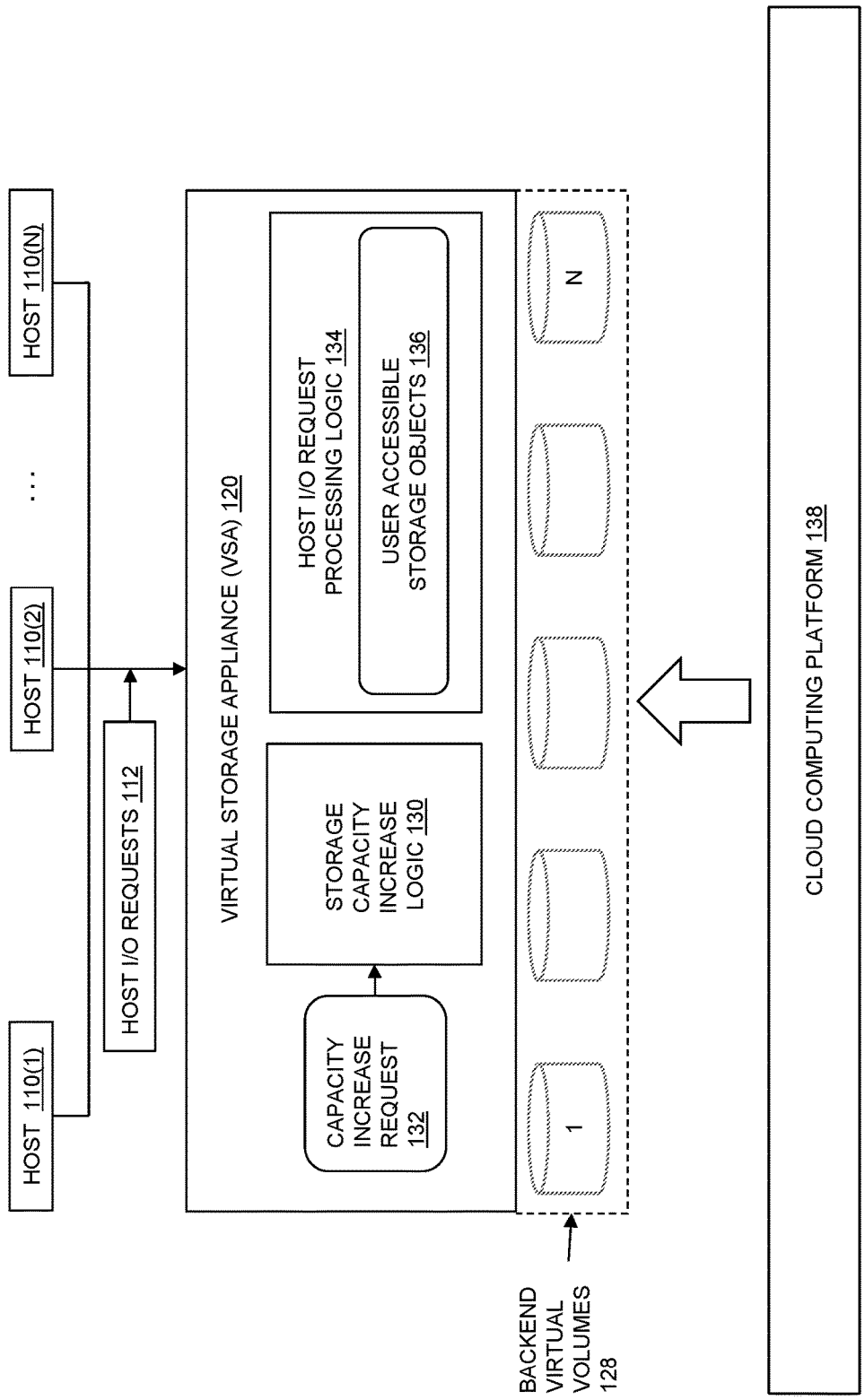
FIG. 1 is a block diagram showing an example of an operational environment including an embodiment of the disclosed technology.

Embodiments of the invention will now be described with reference to the figures. The embodiments described herein are provided only as examples, in order to illustrate various features and principles of the disclosed technology, and the invention is broader than the specific embodiments described herein.

Previous solutions for increasing a total storage capacity of a virtual storage appliance (VSA) have exhibited significant shortcomings. Some previous VSAs running in public cloud computing platforms have approached capacity increases based on legacy physical storage appliances, and therefore inherit capacity expansion schemes that require adding new drives (e.g., cloud volumes or virtual disks), or virtual expansion shelves, to the VSA. These previous solutions have been problematic for multiple reasons, including:

High infrastructure cost of initial system configurations;

High infrastructure cost resulting from very large capacity increments (e.g., the size of an entire virtual volume);

Limited ability to scale to a large capacity without significant initial cost due to a limited number of cloud volume attachment slots in the instances provided by the cloud computing platform;

Poor performance of production workloads, and/or delayed recognition of increased capacity, due to having to perform data rebalancing across cloud volumes, which consumes cloud instance and cloud volume IOPS and throughput; and Poor performance due to performing IOPS (Input/Output Operations Per Second) rebalancing across the attached cloud volumes.

Shortcomings of previous technical solutions such as the above negatively impact the TCO, performance, and usability of previous VSA systems in public cloud computing platforms.

The disclosed VSA technology is designed for execution on public cloud computing platforms, such as Amazon Web Services (AWS) operated by Amazon.com, Inc., Azure operated by Microsoft Corporation, and/or other specific cloud computing platforms. The disclosed VSA technology executes using cloud resources of an underlying cloud computing platform, such as compute resources (e.g., central processing units (CPUs)), storage resources (e.g., solid state disks (SSDs) and/or hard disk drives (HDDs)), networking resources (e.g., virtual routers, firewalls, and bandwidth and network management software), and/or other types of cloud resources provided by the cloud computing platform. The disclosed technology advantageously operates with cost and performance efficiency, even in view of the constraints and limitations imposed in public cloud computing platform contexts, such as:

Relatively low IOPS and throughput limits for virtual machine instances and virtual storage volumes. The disclosed technology avoids the need for data rebalancing, thus eliminating a severe negative impact on performance caused by rebalancing with relatively low IOPS limits.

Tight coupling of the performance of an instance and the performance of its attached backend virtual volumes, due to instance-level throttling and virtual volume-level throttling performed by the public cloud computing platform. Instance performance limits of a cloud computing platform are normally hard-coded, but virtual volume limits are configurable, and can be adjusted when the backend virtual volumes topology changes. The disclosed technology eliminates the need for naïve overprovisioning of the IOPS of the attached virtual volumes significantly beyond the IOPS limit for the VSA instance, thus avoiding unnecessary infrastructure costs.

In configurations requiring large data storage capacities, backend virtual volumes may be initially provisioned with a very large initial size. In previous technologies, increases in the VSA capacity have been accomplished by adding one or more homogeneous (in terms of size) virtual volumes. The disclosed technology operates without adding backend virtual volumes, thus significantly reducing infrastructure costs when increasing total VSA capacity in cases where the desired increase may be much less than the current size of the attached backend virtual volumes, since the customer is required to pay for the raw capacity provisioned from the cloud computing platform, even though only a small fraction of it may be used.

In some cloud computing platforms, the cost of IOPS may be discounted on a per-virtual volume basis. There is accordingly a significant cost advantage when a VSA instance uses the maximum possible number of backend virtual volumes, e.g., with a low per-volume IOPS. Embodiments of the disclosed technology take this into account when determining an initial topology of backend virtual volumes that are attached to the VSA.

Many operations in public cloud computing platforms are asynchronous. For example, simultaneously requested modifications to multiple virtual volumes (e.g., size or IOPS changes) may complete in an arbitrary order. As a result, an instance may temporarily see inconsistent states of its attached virtual volumes, in which the sizes of some virtual volumes have been increased, the size increases of other volumes are still in progress, and some other virtual volumes are otherwise being processed by the cloud computing platform control plane. Advantageously, the disclosed technology accommodates the asynchronous nature of virtual volume modification in a cloud computing platform.

The technology disclosed herein provides a solution to the above-described challenges with a cost-effective and low-overhead capacity expansion technology for VSAs deployed in public cloud environments. The disclosed technology moves away from previous capacity expansion technology in which disks, expansion shelves, or storage nodes are added, to a new capacity expansion technology that is based on resizing (i.e., increasing the size of) backend virtual volumes that are attached to the VSA.

FIG. 1 is a block diagram showing an operational environment for the disclosed technology, including an example of a Virtual Storage Appliance (VSA) 120 in which the disclosed technology is embodied. VSA 120 executes on a public cloud computing platform, shown in FIG. 1 by Cloud Computing Platform 138. Cloud Computing Platform 138 includes a hypervisor or the like, and VSA 120 executes on Cloud Computing Platform 138 by executing on a virtual machine provided by Cloud Computing Platform 138. The virtual machine provided by Cloud Computing Platform 138 is referred to herein for purposes of explanation as an "instance" provided by Cloud Computing Platform 138. The instance provided by Cloud Computing Platform 138 is an instance of a cloud instance type that is defined by Cloud Computing Platform 138, and is subject to constraints on that cloud instance type that are also defined by the Cloud Computing Platform 138.

Cloud Computing Platform 138 may, for example, consist of or include Amazon Web Services (AWS) operated by Amazon.com, Inc., Azure operated by Microsoft Corporation, and/or some other specific cloud computing platform. VSA 120 is program code (software) that executes on cloud compute resources of Cloud Computing Platform 138 that are provisioned from Cloud Computing Platform 138 for execution of the virtual machine on which VSA 120 executes, such as one or more processors (e.g., one or more central processing units (CPUs)) of one or more server computer systems in Cloud Computing Platform 138.

VSA 120 and the cloud compute resources of Cloud Computing Platform 138 that are provisioned from Cloud Computing Platform 138 for execution of the instance on which VSA 120 executes together form control circuitry that is configured and arranged to carry out various methods and functions described herein. VSA 120 includes a variety of software components that may be provided in the form of executable program code. For example, VSA may include software components such as Storage Capacity Increase Logic 130 and Host I/O Request Processing Logic 134. When instructions in the program code of VSA 120 are executed by the cloud compute resources of Cloud Computing Platform 138 that are provisioned for execution of the instance on which VSA 120 executes, those cloud compute resources are caused to carry out the operations of the software components described herein. Although certain software components are shown in the Figures and described herein for purposes of illustration and explanation, those skilled in the art will recognize that VSA 120 may also include various other specific types of software components.

Backend Virtual Volumes 128 are virtual volumes of non-volatile data storage that are attached to and used by VSA 120. Backend Virtual Volumes 128 are based on cloud storage provisioned from cloud storage resources of Cloud Computing Platform 138. Cloud storage resources provisioned from Cloud Computing Platform 138 from which Backend Virtual Volumes 128 are created include one or more non-volatile data storage devices (e.g., solid state drives, magnetic disks, etc.) in Cloud Computing Platform 138. Each one of Backend Virtual Volumes 128 is a cloud storage volume of a cloud storage volume type defined by the Cloud Computing Platform 138, and is subject to constraints on that cloud storage volume type that are also defined by the Cloud Computing Platform 138.

Host Computing Devices 110, referred to as "hosts", are shown for purposes of illustration by Hosts 110(1) through 110(N). Hosts 110 may be virtual and/or physical computing devices. The Hosts 110 and/or applications executing thereon access non-volatile data storage served by VSA 120. For example, Hosts 110 issue Host I/O Requests 112 on behalf of applications executing on Hosts 110. Host I/O Requests 112 may include read and/or write I/O requests. VSA 120 receives Host I/O Requests 112, and Host I/O Request Processing Logic 134 processes Host I/O Requests 112. Processing of Host I/O Requests 112 includes Host I/O Request Processing Logic 134 using portions of the non-volatile data storage in Backend Virtual Volumes 128 to create User Accessible Storage Objects 136 that are accessed by the Host I/O Requests 112. User Accessible Storage Objects 136 store user data specified by Host I/O Requests 112. The User Accessible Storage Objects 136 may, for example, include file-level storage objects (e.g. files), and/or block-level storage objects (e.g. virtual disks), and Host I/O Requests 112 may include file-based and/or block-based I/O requests.

Further during operation of VSA 120, VSA 120 receives Capacity Increase Request 132, e.g. from a user. Capacity Increase Request 132 is a request to increase the total non-volatile data storage capacity of VSA 120, e.g., to a new total capacity indicated by Capacity Increase Request 132.

In some embodiments, VSA 120 (e.g. Storage Capacity Increase Logic 130) validates Capacity Increase Request 132 by determining whether a result of dividing the requested new total capacity by a total number of the backend virtual volumes attached to VSA 120 is evenly divisible by a minimum, per-backend virtual volume increment of increase defined by VSA 120. In the case where the result of dividing the requested new total capacity by a total number of the backend virtual volumes is not evenly divisible by the minimum, per-backend virtual volume increment of increase, the Capacity Increase Request 132 will be rejected, and a user notification to this effect is generated by VSA 120.

For example, each backend virtual volume may be divided into equal-sized regions, referred to as "slices." The slices are a minimum unit of raw storage capacity management for the VSA 120. The slice size is implementation dependent (e.g., 4 GB). The smaller the slice size, the lower the potential cloud storage infrastructure costs required. The minimum, per-backend virtual volume increment of increase used by the disclosed technology may have a value equal to one or more slices.

In response to receipt of Capacity Increase Request 132, Storage Capacity Increase Logic 130 processes Capacity Increase Request 132 by performing a resize operation on all backend virtual volumes that are attached to the VSA 120, e.g., on each backend virtual volume in Backend Virtual Volumes 128. The resize operation increases the size of each individual one of the backend virtual volumes in Backend Virtual Volumes 128. When Storage Capacity Increase Logic 130 subsequently detects that the resize operation has been completed on all the backend virtual volumes, VSA 120 indicates that a new, increased total storage capacity of VSA 120 is available for use, e.g. by indicating to an administrator user that a new, increased total storage capacity of VSA 120 is available to store user data received by VSA 120 from Hosts 110. For example, when Storage Capacity Increase Logic 130 detects that the resize operation has been completed on all the backend virtual volumes, the increased total storage capacity of VSA 120 may be made visible to an administrator user through a management interface of the VSA 120. The management interface of the VSA 120 may be communicated from the VSA 120 to a computer system used by the administrator user, for access by the administrator user thereon. Such a management interface may, for example, consist of or include a GUI (Graphical User Interface), and/or a CLI (Command Line Interface), accessed through a REST (REpresentational State Transfer) API (Application Programming Interface) of the VSA 120.

The resize operation performed by Storage Capacity Increase Logic 130 on Backend Virtual Volumes 128 is performed and completed while retaining all previously stored contents in place on Backend Virtual Volumes 128, without moving any data that was previously stored on Backend Virtual Volumes 128. As a result, no data rebalancing on the backend virtual volumes is required.

The resize operation increases the size of each individual one of the backend virtual volumes in Backend Virtual Volumes 128 by the same amount. As a result, the backend virtual volumes in Backend Virtual Volumes 128 continue to have equal sizes after the resize operation is completed.

During initialization of VSA 120, VSA 120 (e.g., Storage Capacity Increase Logic 130) may determine a total number of backend virtual volumes to be attached to VSA 120, i.e., a total number of backend virtual volumes in Backend Virtual Volumes 128. The total number of backend virtual volumes to be attached to VSA 120 is determined based on multiple constraints. After initialization of VSA 120, the same total number of backend virtual volumes is maintained throughout the successfully completed processing of one or more requests to increase the total storage capacity VSA 120. The total number of backend virtual volumes attached to the virtual storage appliance that is determined during initialization of VSA 120 may be equal to a maximum number of backend virtual volumes allowed by the multiple constraints.

Further during initialization of VSA 120, an initial backend virtual volume size may also be determined, e.g. by Storage Capacity Increase Logic 130, also based on the multiple constraints. The initial backend virtual volume size is then used during initialization of the VSA 120 as an initial size for each one of the virtual volumes in Backend Virtual Volumes 128.

The multiple constraints used by VSA 120 during initialization to determine the total number of backend virtual volumes attached to VSA 120 and/or the initial size for each one of the backend virtual volumes attached to VSA 120 may include one or more of the constraints on the cloud instance type of the instance on which VSA 120 executes.

Alternatively, or in addition, the multiple constraints used by VSA 120 during initialization to determine the total number of backend virtual volumes attached to VSA 120 and/or the initial size for each one of the backend virtual volumes attached to VSA 120 may include one or more of the constraints on the cloud storage volume type of the backend virtual volumes attached to VSA 120.

Alternatively, or in addition, the multiple constraints used by VSA 120 during initialization to determine the total number of backend virtual volumes attached to VSA 120 and/or the initial size for each one of the backend virtual volumes attached to VSA 120 may include one or more constraints on VSA 120, e.g. one or more system constraints defined by program code of VSA 120.

Figure 2:
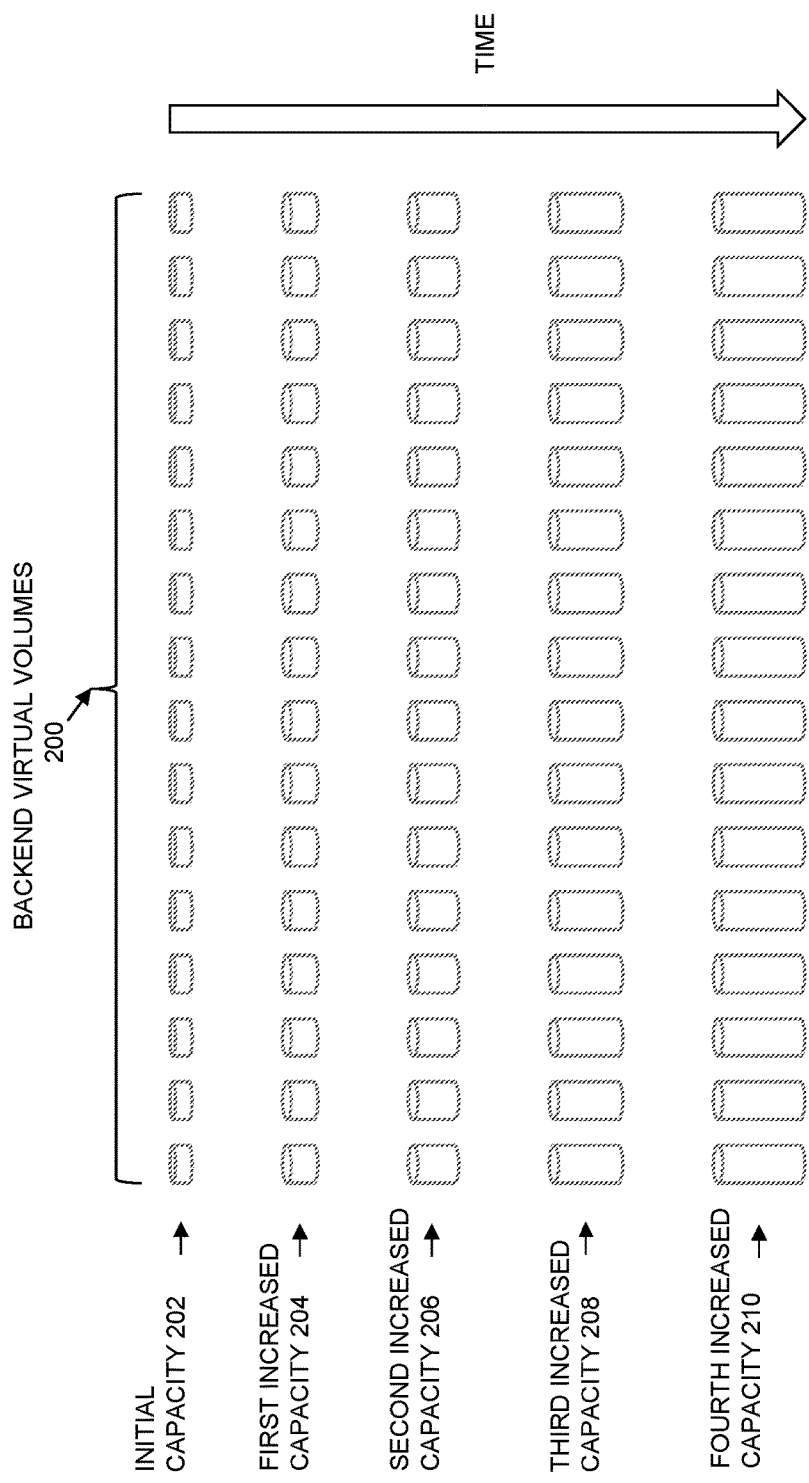
FIG. 2 is a block diagram illustrating operation of an embodiment of disclosed technology, across multiple increases in the total data storage capacity of a VSA.

FIG. 2 is a block diagram illustrating operation of an embodiment of the disclosed technology, showing increasing backend virtual volume sizes across multiple increases in the total data storage capacity of a VSA over a time period. In the example of FIG. 2, Backend Virtual Volumes 200 includes sixteen virtual volumes. At initialization of the VSA, an Initial Capacity 202 of the VSA is determined, in which each backend virtual volume has an initial size. Over time, multiple capacity increase requests are received and processed by the VSA, each of which increases the total storage capacity of the VSA. Processing of each capacity increase request increases the total storage capacity of the VSA by performing virtual volume resize operations on the Backend Virtual Volumes 200 that increase the size of each one of the backend virtual volumes in Backend Virtual Volumes 200 by the same amount, without adding any virtual volumes to Backend Virtual Volumes 200, and while maintaining all previously stored data in place on the Backend Virtual Volumes 200. In the example of FIG. 2, the increased sizes of the Backend Virtual Volumes 200 corresponding to the increased total capacities of the VSA resulting from the processing of four sequential capacity increase requests over time are illustrated by the increasingly large virtual volumes in Backend Virtual Volumes 200, indicated by First Increased Capacity 204, Second Increased Capacity 206, Third Increased Capacity 208, and then Fourth Increased Capacity 210.

In addition to the above-mentioned slice size, two other factors also impact the amount of cloud storage infrastructure costs:
  i) The minimum number of slices that are required for the initial backend virtual volumes configuration, and
  ii) The number of slices that are required as the minimum, per-backend virtual volume increment of capacity increase.

The lower the values of these additional factors, the lower the potential cloud storage infrastructure cost.

Figure 3:
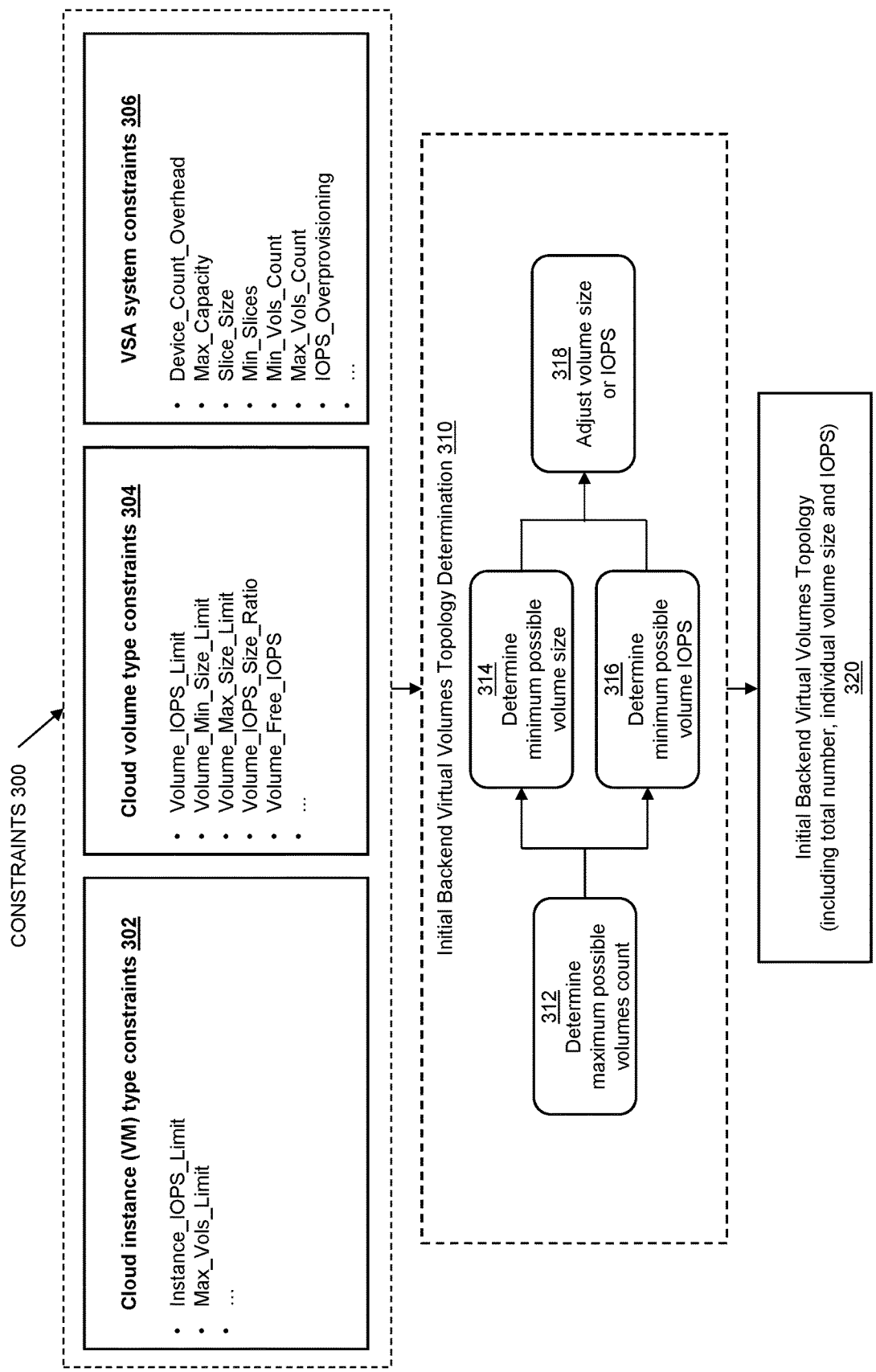
FIG. 3 is a flow chart illustrating operation of an embodiment of the disclosed technology to generate an initial topology of backend virtual volumes that are attached to a VSA.

The disclosed technology includes program logic in the VSA (e.g., in Storage Capacity Increase Logic 130) that implements an algorithm that determines an initial backend virtual volumes topology. An example of the steps in this algorithm are shown in FIG. 3 in the flow chart labeled Initial Backend Virtual Volumes Topology Determination 310. As shown in FIG. 3, performing the steps of Backend Virtual Volumes Determination 310 generates Initial Backend Virtual Volumes Topology 320, which is used to initially provision the backend virtual volumes attached to the VSA at the time the VSA is initialized. The Initial Backend Virtual Volumes Topology 320 may include:
  i) A total number of backend virtual volumes to be attached to the VSA, and
  ii) A volume specification for each one of the attached backend virtual volumes, defining:
    a size of each backend virtual volume,
    an IOPS provisioned for each backend virtual volume, and
    other backend virtual volume parameters (e.g., throughput, etc.).

The volume specification in Initial Backend Virtual Volumes topology 320 is initially the same for all the backend virtual volumes.

The steps of Initial Backend Virtual Volumes Determination 310 are performed based on inputs including Constraints 300. Constraints 300 include Cloud Instance Type Constraints 302, Cloud Volume Type Constraints 304, and VSA System Constraints 306.

Cloud Instance Type Constraints 302 are constraints on the cloud instance type of the instance on which VSA 120 executes. For example, in the case where the Cloud Computing Platform 138 is Amazon Web Services (AWS), Cloud Instance Type Constraints 302 may be constraints on Amazon EC2 (Elastic Compute Cloud) instances. Such constraints may include per-instance constraints enforced by the Cloud Computing Platform 138, such as a per-instance IOPS limit (Instance_IOPS_Limit), a per-instance maximum attached virtual volumes limit (Max_Vols_Limit), and/or other specific instance level constraints.

Cloud Volume Type Constraints 304 are constraints on the virtual volume type of the backend virtual volumes. For example, in the case where the Cloud Computing Platform 138 is Amazon Web Services (AWS), Cloud Volume Type Constraints 304 may be constraints on the Amazon EBS (Elastic Block Store) gp3 volume type. Such constraints may include per-volume constraints enforced by the Cloud Computing Platform 138, such as a per-volume IOPS limit (Volume_IOPS_Limit), a per-volume minimum size limit (Volume_Min_Size_Limit), a per-volume maximum size limit (Volume_Max_Size_Limit), a maximum per-volume IOPS to size ratio (Volume_IOPS_Size_Ratio), a per-volume free IOPS (Volume_Free_IOPS), and/or other specific per-volume level constraints.

VSA System Constraints 306 are constraints defined by the program code of the virtual storage appliance. For example, such constraints may include per-VSA constraints enforced by the program code of the VSA, such as a number of backend virtual volumes defined for overhead (Device_Count_Overhead), a maximum storage capacity (Max_Capacity), a slice size (Slice_Size), a minimum number of slices (Min_Slices) and a minimum number of backend virtual volumes (Min_Volumes_Count), a maximum number of backend virtual volumes (Max_Vols_Count), a required amount of per-volume IOPS overprovisioning (IOPS_Overprovisioning), and/or other specific VSA constraints.

The steps of Initial Backend Virtual Volumes Determination 310 determine a least costly Initial Backend Virtual Volumes Topology 320 that meets Constraints 300. The steps are performed such that:

i) The number of backend virtual volumes in the initial topology is maximized, so that per-volume cost savings is provided for at least some types of cloud storage, and scalability to higher total capacity is enabled; and ii) All backend virtual volumes have identical size and provisioned performance, to simplify the data path implementation of the VSA.

As shown in FIG. 3, at step 312 a maximum possible number of backend virtual volumes is determined, while meeting the constraints in Cloud Instance Type Constraints 302 (e.g. Max_Vols_Limit) and/or VSA System Constraints 306 (e.g. Max_Vols_Count).

A step 314, a minimum possible backend virtual volume size is determined, which meets Cloud Volume Type Constraints 304 (e.g., Volume_Min_Size_Limit) and/or VSA System Constraints 306.

At step 316, a minimum possible per-volume IOPS is independently determined, which also meets Cloud Volume Type Constraints 304 and/or VSA System Constraints 306.

Finally, at step 318, the volume size determined at step 314 or the per-volume IOPS determined at step 316 may be adjusted to make the relationship between volume size and per-volume IOPS satisfies Volume_IOPS_Size_Ratio. If Volume_IOPS_Size_Ratio is not satisfied (i.e., exceeded), then at step 318 either the volume size determined at step 314 may be increased, or the per-volume IOPS determined at step 316 may be decreased, in order to satisfy Volume_IOPS_Size_Ratio, depending on a predetermined policy. The adjusted volume size and per-volume IOPS are then output in Initial Backend Virtual Volumes Topology 320, and used to initially configure the size and IOPS of each one of the backend virtual volumes when they are provisioned and attached to the VSA at the time the VSA is initialized.

Figure 4:
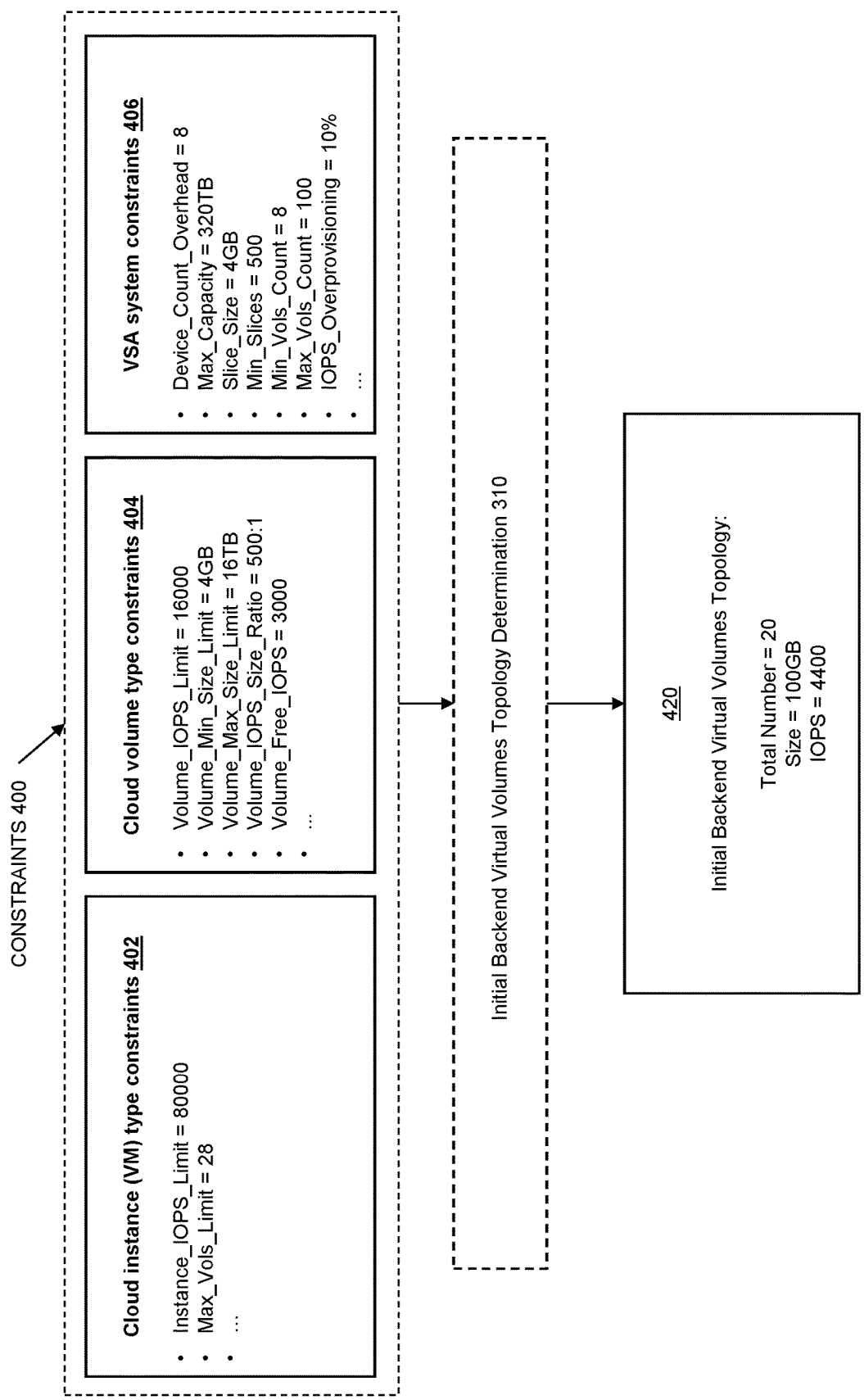
FIG. 4 shows a first use case illustrating the determination, by an embodiment of the disclosed technology, of an initial topology of backend volumes attached to a VSA.
Figure 5:
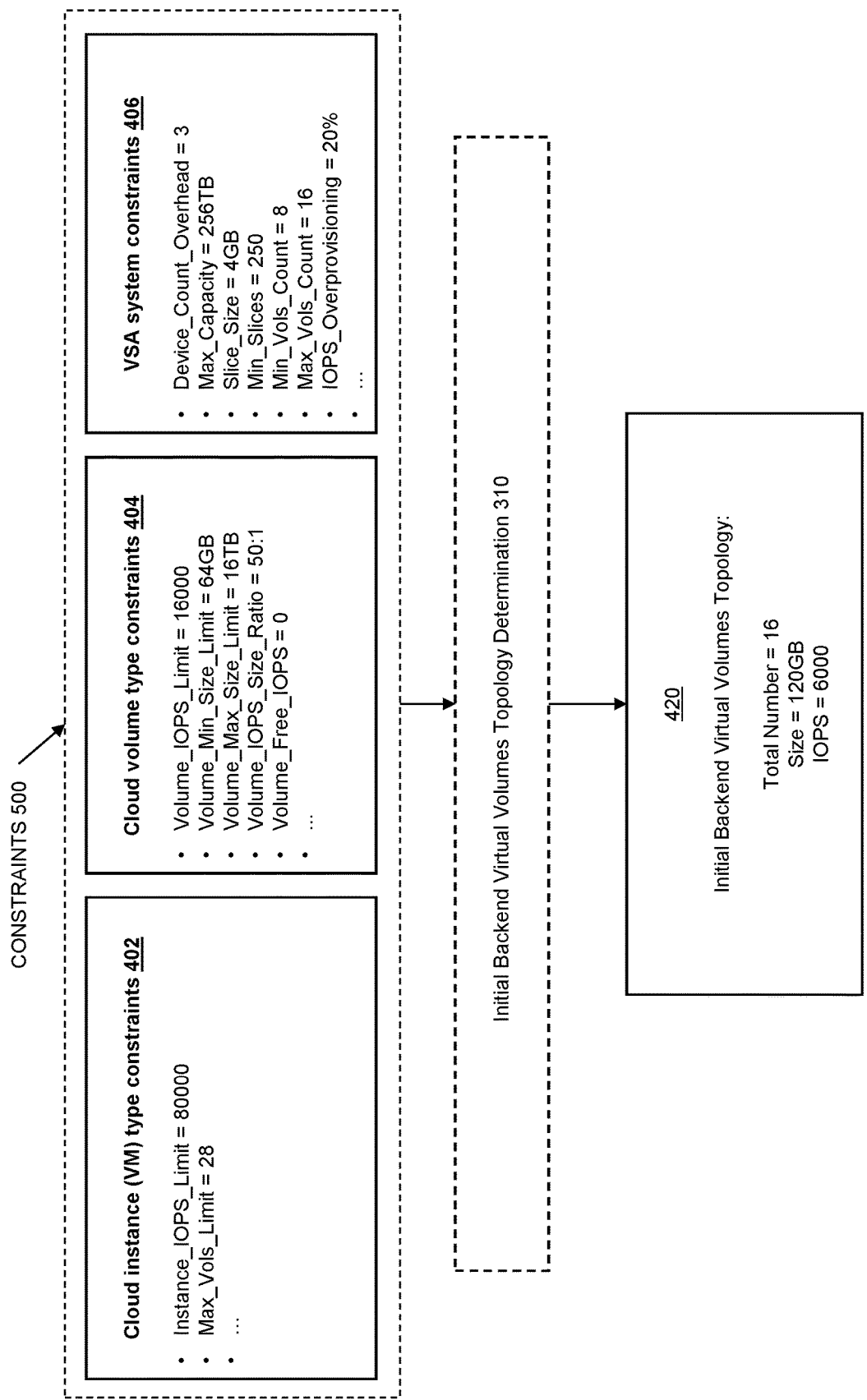
FIG. 5 shows a second use case illustrating the determination, by an embodiment of the disclosed technology, of an initial topology of backend volumes attached to a VSA.

FIGS. 4 and 5 show use cases for the steps in Initial Backend Virtual Volumes Determination 310 for two different sets of input parameters. In FIG. 4, the input parameters are Constraints 400, containing Cloud Instance Type Constraints 402, Cloud Volume Type Constraints 404, and VSA System Constraints 406. In FIG. 5, the input parameters are Constraints 500, containing Cloud Instance Type Constraints 502, Cloud Volume Type Constraints 504, and VSA System Constraints 506. In both use cases, the resulting initial backend virtual volumes topology (Initial Backend Virtual Volumes Topology 420 in FIG. 4 and Initial Backend Virtual Volumes Topology 520 in FIG. 5) is the most cost-effective for the set of input parameters. As further described below, in the example of FIG. 5, the volume size is adjusted twice, first to meet the Volume_Min_Size_Limit of Cloud Volume Type Constraints 504, and then again to comply with the Volume_IOPS_Size_Ratio in Cloud Volume Type Constraints 504.

With reference now to the use case of FIG. 4, at step 312 (FIG. 3), determining the maximum possible volumes count includes determining a value of 20 by subtracting the value of Device_Count_Overhead (e.g., 8) from the value of Max_Vols_Limit (e.g., 28), for a resulting maximum possible volumes count of 20. Also at step 312, the value of 20 is confirmed to conform to (i.e., to be less than) the value of Max_Vols_Count (e.g., 100). Then, at step 314 (FIG. 3), a volume size is determined by multiplying the value of Slice_Size (e.g., 4 GB) by the value of Min_Slices (e.g., 500) divided by the maximum possible volumes count of 20 that was determined at step 312, for a resulting volume size of 100 GB. Further at step 314, the volume size of 100 GB is determined to meet (i.e., be not less than) the value of Volume_Min_Size_Limit (e.g., 4 GB). At step 316 (FIG. 3), an IOPS is determined by dividing the value of Instance_IOPS Limit (e.g., 80000) by the maximum possible volumes count of 20 that was determined at step 312, for a resulting IOPS of 4000. Further at step 316, the IOPS of 4000 is increased by the value of IOPS_Overprovisioning (e.g., 10%), for a resulting IOPS of 4400. At step 318 (FIG. 3), the volume size of 100 GB and the IOPS of 4400 are determined to conform to (i.e., be less than) the ratio in Volume_IOPS_Size_Ratio (i.e., 500:1). Accordingly, the resulting Initial Backend Virtual Volumes Topology 420 generated in the use case shown in FIG. 4 indicates a total number of backend virtual volumes, each of which is provisioned with a size of 100 GB and an IOPS of 4400.

With reference now to the use case of FIG. 5, at step 312 (FIG. 3), determining the maximum possible volumes count includes determining a value of 25 by subtracting the value of Device_Count_Overhead (e.g., 3) from the value of Max_Vols_Limit (e.g., 28), for a resulting maximum possible volumes count of 25. Also at step 312, the value of 25 is confirmed to not conform to (i.e., to be greater than) the value of Max_Vols_Count (e.g., 16), resulting in the replacement of value 25 with the value of Max_Vols_Count (e.g., 16) in order to conform to the Max Vol s Count constraint.

Then, at step 314 (FIG. 3), a volume size is determined by multiplying the value of Slice_Size (e.g., 4 GB) by the value of Min_Slices (e.g., 250) divided by the maximum possible volumes count of 16 that was determined at step 312, for a resulting volume size of 62.5 GB. Further at step 314, the volume size of 62.5 GB is determined to not conform to (i.e., to be less than) the value of Volume_Min_Size_Limit (e.g., 64 GB), resulting in the volume size of 62.5 GB being replaced by 64 GB, in order to conform to the Volume_Min_Size_Limit constraint. At step 316 (FIG. 3), an IOPS is determined by dividing the value of Instance_IOPS_Limit (e.g., 80000) by the maximum possible volumes count of 16 that was determined at step 312, for a resulting IOPS of 5000. Further at step 316, the IOPS of 5000 is increased by the value of IOPS_Overprovisioning (e.g., 20%), for a resulting IOPS of 6000. At step 318 (FIG. 3), the ratio of the IOPS of 6000 to the volume size of 64 GB is determined to not conform to (i.e., be greater than) the maximum ratio in Volume_IOPS_Size_Ratio (i.e., 50:1). As a result, the volume size is increased to 120 GB, so that the IOPS and volume size to conform to the maximum ratio in Volume_IOPS_Size_Ratio. Accordingly, the resulting Initial Backend Virtual Volumes Topology 520 generated in the use case shown in FIG. 5 indicates a total number of 16 backend virtual volumes, each of which is provisioned with a size of 120 GB and an IOPS of 6000.

Figure 6:
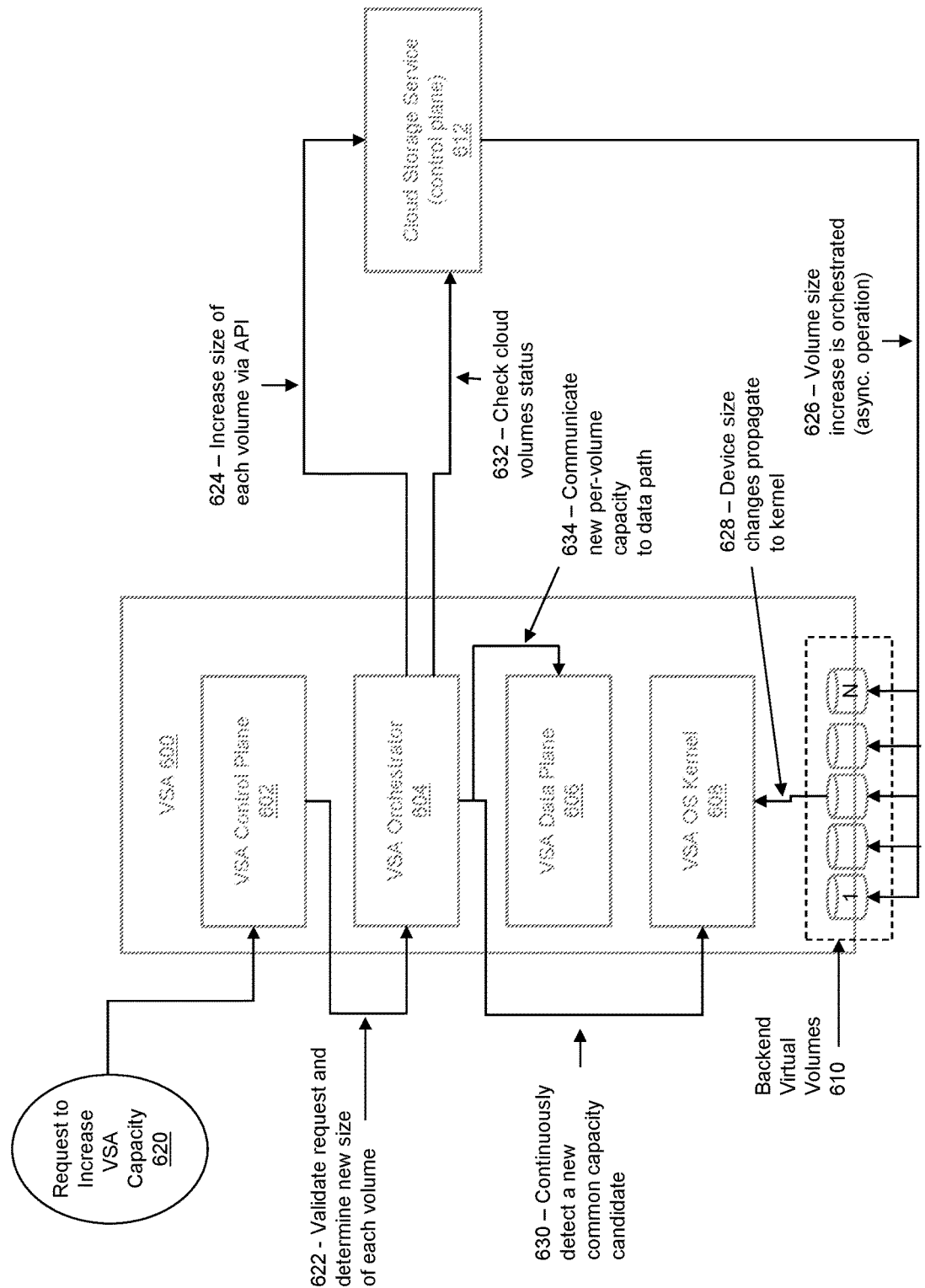
FIG. 6 is a block diagram showing an example of structure and operation in some embodiments of the disclosed technology.
Figure 7:
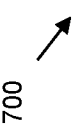
FIG. 7 is a first table illustrating a common capacity candidate in a first use case.

FIG. 6 shows an example of the structure and operation of a VSA 600 in some embodiments of the disclosed technology. As shown in FIG. 6, a Request to Increase VSA Capacity 620 is issued by a user and received by VSA Control Plane 602. The request indicates a new total data storage capacity for VSA 600.

At 622, the VSA Control Plane 602 validates the request. VSA Control Plane 602 may validate the request by determining whether the requested new total storage capacity is larger than a current capacity of VSA 600, and whether a result of dividing the requested new capacity by the number of volumes in Backend Virtual Volumes 610 is equal to one or more minimum, per-backend virtual volume increments of increase (e.g., is equal to one or more slices). If the requested new capacity is larger than the current capacity, and the result of dividing the requested new capacity by the number of backend virtual volumes is equal to one or more minimum increments of increase, the request size is valid. The result of dividing the requested new capacity by the number of backend virtual volumes is then used as an amount of increase to be added to the current size of each one of the backend virtual volumes in order to generate a new, per-backend virtual volume size. The new, per-backend virtual volume size is then passed to VSA Orchestrator 604.

Otherwise, if the VSA Control Plane 602 determines that the request is not valid, the request 620 is not processed further, and an invalid request message may be sent to the user. At 624, VSA Orchestrator 604 issues size increase requests for each one of the virtual volumes in Backend Virtual Volumes 610, indicating the new per-backend virtual volume size determined at 622. The size increase requests generated at 624 may, for example, be issued to an API (Application Programming Interface) of a control plane in a Cloud Storage Service 612 of the Cloud Computing Platform 138 (FIG. 1).

At 626, the control plane of Cloud Storage Service 612 orchestrates the size increase of each virtual volume in Backend Virtual Volumes 610. The size increases of the individual virtual volumes performed by the control plane of Cloud Storage Service 612 are asynchronous operations, and may take a significant amount of time to complete.

At 628, the VSA OS Kernel 608 starts to recognize block device (e.g., SCSI (Small Computer System Interface), NVMe (Non-Volatile Memory Express), etc.) size changes in individual ones of the Backend Virtual Volumes 610. The size change propagations to VSA Kernel 608 may occur sequentially, or in parallel, for individual ones of the Backend Virtual Volumes 610 attached to VSA 600.

At 630, the VSA Orchestrator 604 determines a new common capacity candidate for the virtual volumes in Backend Virtual Volumes 610. VSA Orchestrator 604 needs to determine whether a new common capacity for each virtual volume is found across all the attached virtual volumes, and can therefore be used by the VSA Data Plane 606. For example, VSA Orchestrator 604 may need to determine a new common capacity candidate for all the attached virtual volumes, to later be communicated to VSA Data Plane 606, so that the new capacity can be exposed by VSA Data Plane 606 to Host I/O Request Processing Logic 134 (FIG. 1), so that Host I/O Request Processing Logic 134 can use the new capacity. For example, to determine a new common capacity candidate, VSA Orchestrator 604 may use a detected size of each backend virtual volume Size, a currently used capacity per backend virtual volume Used (i.e., the current capacity of each virtual volume that is used before the VSA capacity increase, which is the same across all backend virtual volumes), and a minimum, per-virtual volume increment of increase that is equal to one or more slices Inc. For example, in some embodiments, VSA Orchestrator 604 may determine a new common capacity candidate New using an implantation of a formula such as the following:

$$\text{New} = \text{Used} + \text{Min}\left(\text{Round}\left(\frac{\text{Size\_i} - \text{Used}}{\text{Inc}}\right) * \text{Inc}\right)$$

At 632, after a new common capacity candidate is found in step 630, VSA Orchestrator 604 checks with the control plane of Cloud Storage Service 612, to determine whether the virtual volume modification operation initiated at step 624 has been completed for all the virtual volumes in Backend Virtual Volumes 610. This step may be important, because the virtual volume size change propagation at step 628 may happen significantly before all background operations associated with changing the size of the virtual volumes are complete. If at 632 VSA Orchestrator 604 determines that the virtual volume modification operation has not yet been completed for all the virtual volumes in Backend Virtual Volumes 610, VSA Orchestrator 604 waits for the completion for all the virtual volumes.

At 634, VSA Orchestrator 604 communicates the successfully established new capacity of each virtual volume in the Backend Virtual Volumes 610 to VSA Data Plane 606 for use by VSA Data Plane 606. Advantageously, the new capacity communicated at 634 is the same for each of the virtual volumes in Backend Virtual Volumes 610. As a result, the interface between VSA Orchestrator 604 and VSA Data Plane 606 is significantly simplified, since only one number needs to be communicated from VSA Orchestrator 604, and there is no possibility of inconsistency across volumes. In addition, there is no need to do any rebalancing of previously stored data across the virtual volumes in order to use the new capacity, and each virtual volume has the same number of new ready-to-use slices. The new capacities are then available for use by VSA Data Plane 606, and VSA Data Plane 606 may expose the new capacities to Host I/O Request Processing Logic 134 (FIG. 1) for use by Host I/O Request Processing Logic 134. The increased total capacity of VSA 600 may then be exposed by VSA 600 to an administrator user through a management interface of the VSA 600.

FIGS. 7-10 include tables 700, 800, 900, and 1000, which show examples of new common capacity candidates determined for four backend virtual volumes in four different use cases. In each table, the common capacity candidate (which is the same for each virtual volume) calculated by the disclosed technology in step 630 of FIG. 6 is shown under the table heading "New used capacity". In the examples of FIGS. 7-10, the minimum, per-backend virtual volume increment of increase is equal to two slices.

Figure 8:
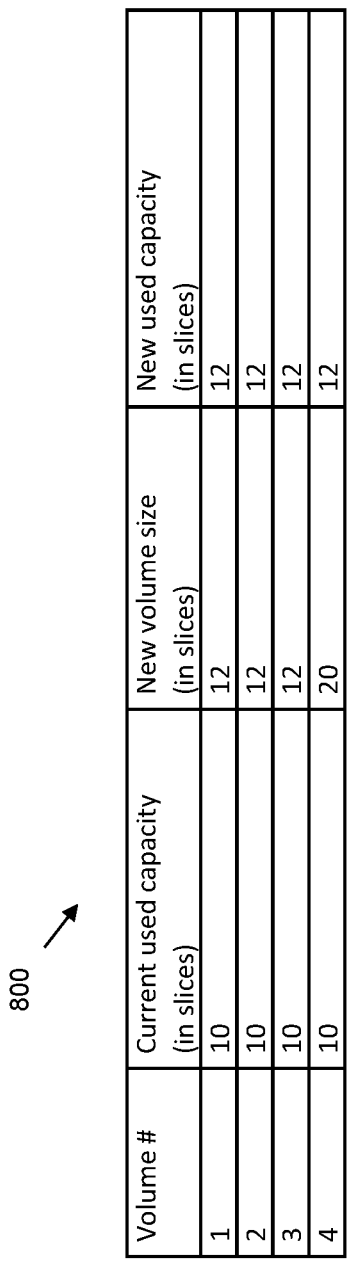
FIG. 8 is a second table illustrating a common capacity candidate in a second use case.
Figure 9:
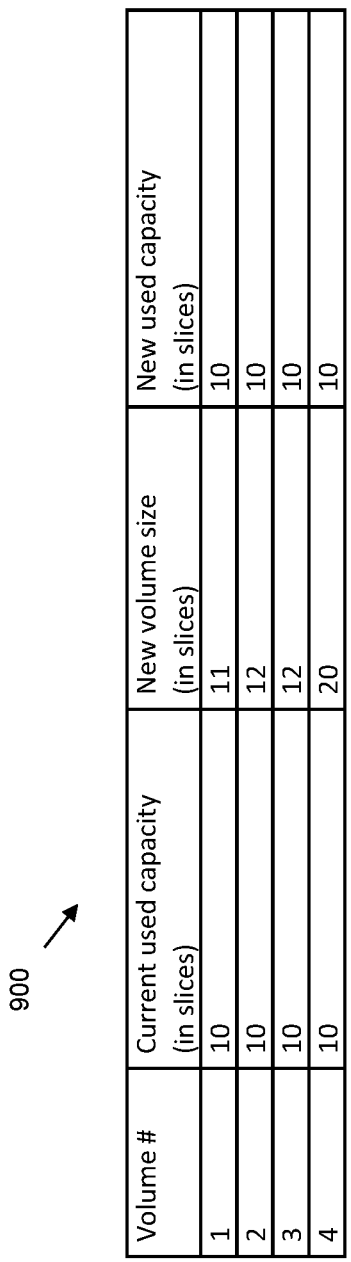
FIG. 9 is a third table illustrating a common capacity candidate in a third use case.
Figure 10:
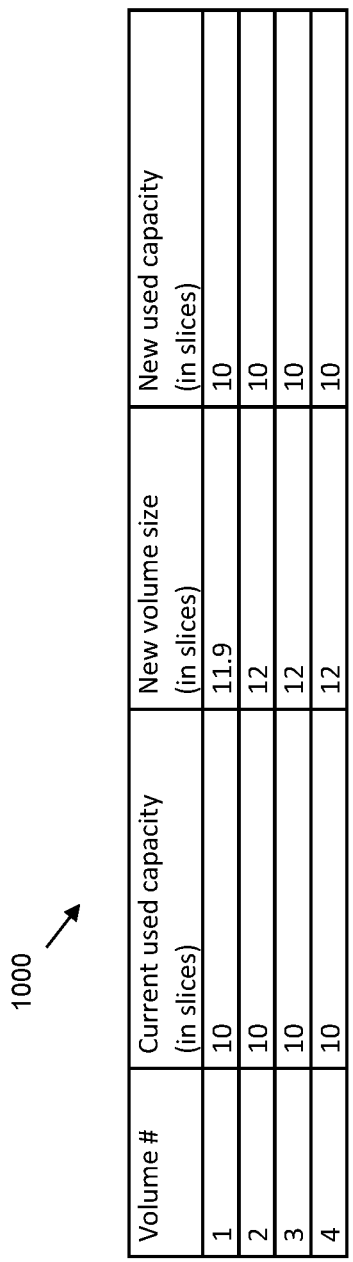
FIG. 10 is a fourth table illustrating a common capacity candidate in a fourth use case.

The examples in FIGS. 8-10 illustrate use cases in which not all slices in the backend virtual volumes can be utilized, because the backend virtual volumes have different sizes. Such use cases are normally avoided by the disclosed technology, since the validation performed at step 622 of FIG. 6 ensures that the requested new total capacity for the VSA can be accommodated by increasing the size of all backend virtual volumes by the same amount. However, in some public cloud computing platforms an end user may increase capacity of individual virtual volumes directly (e.g., via a cloud management console), and thereby bypass the validation performed at step 622 of FIG. 6. The disclosed technology may be embodied to operate under such conditions by detecting any unusable capacity in one or more of the backend virtual volumes, and to generate an alert to the user in this regard.

Figure 11:
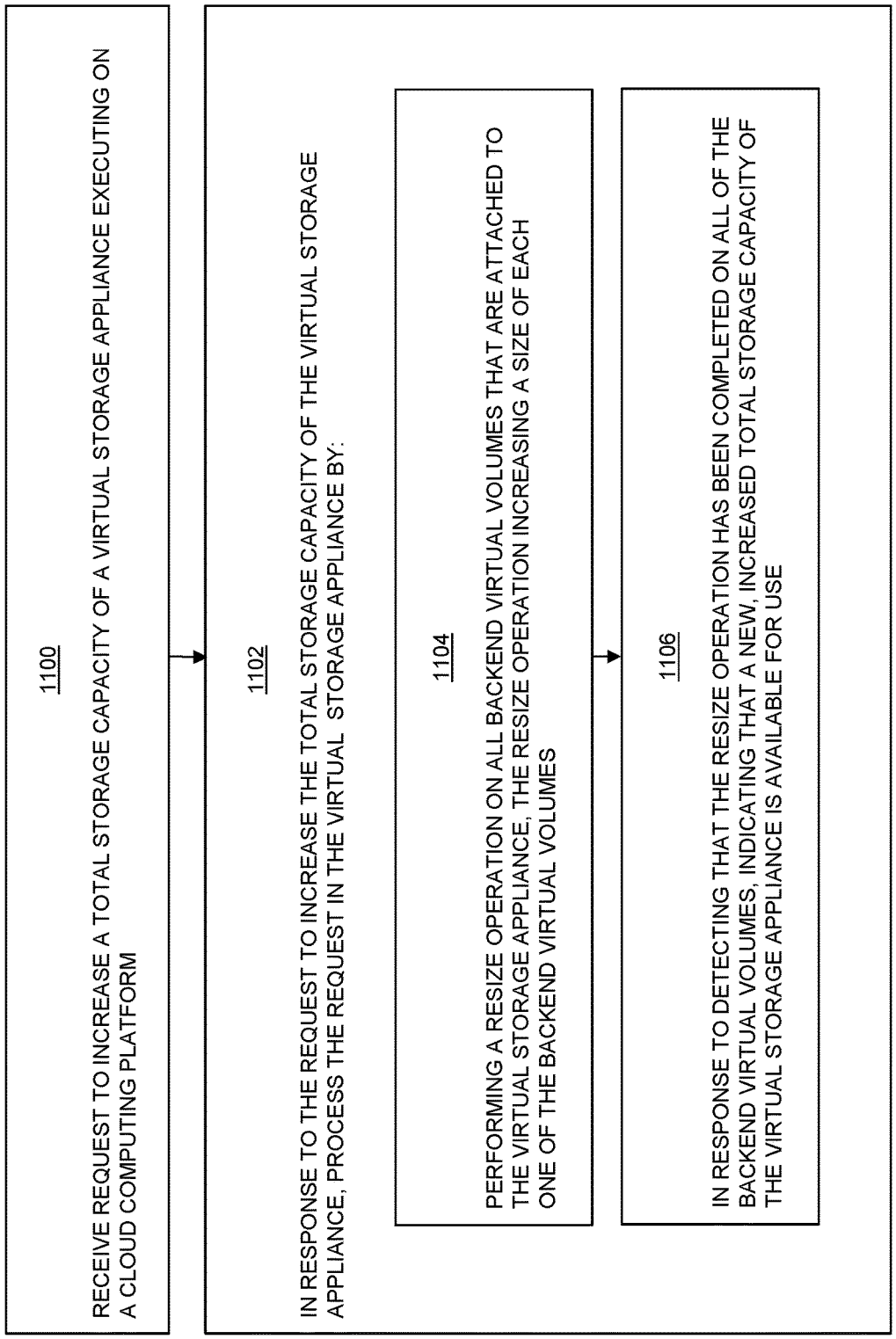
FIG. 11 is a flow chart example illustrating steps performed during operation of some embodiments of the disclosed technology.

FIG. 11 is a flow chart example illustrating steps performed during operation of some embodiments of the disclosed technology.

As shown in FIG. 11, in step 1100, a request is received to increase the total data storage capacity of a virtual storage appliance executing on a public cloud computing platform.

In step 1102, in response to the request to increase the total storage capacity of the virtual storage appliance, the disclosed technology processes the request in the virtual storage appliance by performing steps 1104 and 1106. In step 1104, the disclosed technology performs a resize operation on all backend virtual volumes that are attached to the virtual storage appliance. The resize operation increases the size of each one of the backend virtual volumes, e.g. by the same amount. In step 1106, in response to detecting that the resize operation has been completed on all of the individual backend virtual volumes, the disclosed technology indicates that a new, increased total storage capacity of the virtual storage appliance is available for use.

As will be appreciated by those skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
   during initialization of a virtual storage appliance executing on a cloud computing platform, determining a total number of backend virtual volumes attached to the virtual storage appliance, based on a plurality of constraints; and
   in response to a request to increase a total storage capacity of the virtual storage appliance, processing the request in the virtual storage appliance by:
      performing a resize operation on all of the backend virtual volumes that are attached to the virtual storage appliance, wherein the resize operation increases a size of each one of the backend virtual volumes;
      in response to detecting that the resize operation has been completed on all of the backend virtual volumes, indicating that a new, increased total storage capacity of the virtual storage appliance is available for use; and maintaining the same total number of backend virtual volumes that are attached to the virtual storage appliance as was determined during initialization of the virtual storage appliance throughout the processing of the request to increase the total storage capacity of the virtual storage appliance.

2. The method of claim 1, wherein performing the resize operation on the backend virtual volumes is completed while retaining all previously stored contents of the backend virtual volumes in place, without moving any of the previously stored contents of the backend virtual volumes.

3. The method of claim 1, wherein performing the resize operation on all of the backend virtual volumes increases the size of each one of the backend virtual volumes by the same amount.

4. The method of claim 1, further comprising:
during initialization of the virtual storage appliance, determining an initial backend virtual volume size that is the same for each of the backend virtual volumes, based on the plurality of constraints.

5. The method of claim 4, wherein the total number of backend virtual volumes attached to the virtual storage appliance determined during initialization of the virtual storage appliance comprises a maximum number of backend virtual volumes allowed by the plurality of constraints.

6. The method of claim 5, wherein the virtual storage appliance executes on an instance of a cloud instance type defined by the cloud computing platform, and wherein the plurality of constraints comprises at least one constraint on the cloud instance type.

7. The method of claim 6, wherein the backend virtual volumes comprise cloud storage volumes of a cloud storage volume type defined by the cloud computing platform, and wherein the plurality of constraints further comprises at least one constraint on the cloud storage volume type.

8. The method of claim 7, wherein the constraints further comprise at least one constraint defined by program code of the virtual appliance.

9. The method of claim 1, further comprising:
processing, by the virtual storage appliance, host I/O (Input/Output) requests received by the virtual storage appliance from one or more hosts; and
wherein the processing of the host I/O requests includes using the backend virtual volumes to create user accessible storage objects that are accessed by the host I/O requests.

10. The method of claim 9, wherein indicating that the new, increased total storage capacity of the virtual storage appliance is available for use comprises indicating to an administrator user that the new, increased total storage capacity of the virtual storage appliance is available for use.

11. The method of claim 1, wherein the request to increase the total storage capacity of the virtual storage appliance includes a requested new total storage capacity, and further comprising:
validating the request to increase the total storage capacity of the virtual storage appliance at least in part by determining whether a result of dividing the requested new total storage capacity by a total number of the backend virtual volumes is evenly divisible by a minimum, per-backend virtual volume increment of increase.

12. A system comprising:
a virtual storage appliance executing on a cloud computing platform, wherein the virtual storage appliance includes program code for expanding a total storage capacity of the virtual storage appliance;
wherein the program code, when executed by computing resources of the cloud computing platform including at least one central processing unit, causes the computing resources to:
during initialization of the virtual storage appliance, determine a total number of backend virtual volumes attached to the virtual storage appliance, based on a plurality of constraints; and
in response to a request to increase a total storage capacity of the virtual storage appliance, process the request in the virtual storage appliance by:
performing a resize operation on all of the backend virtual volumes that are attached to the virtual storage appliance, wherein the resize operation increases a size of each one of the backend virtual volumes;
in response to detecting that the resize operation has been completed on all of the backend virtual volumes, indicating that a new, increased total storage capacity of the virtual storage appliance is available for use; and
maintaining the same total number of backend virtual volumes that are attached to the virtual storage appliance as was determined during initialization of the virtual storage appliance throughout the processing of the request to increase the total storage capacity of the virtual storage appliance.

13. The system of claim 12, wherein the program code, when executed by the computing resources of the cloud computing platform, further causes the computing resources to complete performance of the resize operation on the backend virtual volumes while retaining all previously stored contents of the backend virtual volumes in place, without moving any of the previously stored contents of the backend virtual volumes.

14. The system of claim 12, wherein the program code, when executed by the computing resources of the cloud computing platform, further causes the computing resources to perform the resize operation on all of the backend virtual volumes by increasing the size of each one of the backend virtual volumes by the same amount.

15. The system of claim 12, wherein the program code, when executed by the computing resources of the cloud computing platform, further causes the computing resources to:
during initialization of the virtual storage appliance, determine an initial backend virtual volume size that is the same for each of the backend virtual volumes, based on the plurality of constraints.

16. The system of claim 15, wherein the total number of backend virtual volumes attached to the virtual storage appliance determined during initialization of the virtual storage appliance comprises a maximum number of backend virtual volumes allowed by the plurality of constraints.

17. The system of claim 16, further comprising:
wherein the virtual storage appliance executes on an instance of a cloud instance type defined by the cloud computing platform, and wherein the plurality of constraints comprises at least one constraint on the cloud instance type;
wherein the backend virtual volumes comprise cloud storage volumes of a cloud storage volume type defined by the cloud computing platform, and wherein the plurality of constraints further comprises at least one constraint on the cloud storage volume type; and wherein the constraints further comprise at least one constraint defined by program code of the virtual appliance.

18. A computer program product including a non-transitory computer readable medium having instructions stored thereon, wherein the instructions, when executed on processing circuitry, cause the processing circuitry to perform steps including:

during initialization of a virtual storage appliance executing on a cloud computing platform, determining a total number of backend virtual volumes attached to the virtual storage appliance, based on a plurality of constraints; and in response to a request to increase a total storage capacity of the virtual storage appliance executing on a cloud computing platform, processing the request in the virtual storage appliance by:

performing a resize operation on all backend virtual volumes that are attached to the virtual storage appliance, wherein the resize operation increases a size of each one of the backend virtual volumes;

in response to detecting that the resize operation has been completed on all of the backend virtual volumes, indicating that a new, increased total storage capacity of the virtual storage appliance is available for use; and maintaining the same total number of backend virtual volumes that are attached to the virtual storage appliance as was determined during initialization of the virtual storage appliance throughout the processing of the request to increase the total storage capacity of the virtual storage appliance.

\* \* \* \* \*